United States Patent
Blanchard et al.

(10) Patent No.: US 6,394,002 B1
(45) Date of Patent: May 28, 2002

(54) DEVICE FOR HOLDING AND ARTICULATING A REMOVABLE REAR SHELF OF A MOTOR VEHICLE

(75) Inventors: Christophe Blanchard, Mouzon; Cédric Habert, Sedan, both of (FR)

(73) Assignee: Sai Automotive Sommer Industrie, Nanterre (FR)

( * ) Notice: Subject to any disclaimer, the term of this patent is extended or adjusted under 35 U.S.C. 154(b) by 0 days.

(21) Appl. No.: 09/588,901

(22) Filed: Jun. 9, 2000

(30) Foreign Application Priority Data

Jun. 11, 1999 (FR) .............................. 99 07417

(51) Int. Cl.[7] .............................................. A47B 23/00
(52) U.S. Cl. .......................................................... 108/44
(58) Field of Search .............................. 108/44, 40, 35, 108/45, 33, 152

(56) References Cited

U.S. PATENT DOCUMENTS

| | | | | |
|---|---|---|---|---|
| 2,050,951 A | * | 8/1936 | Hundertmark | ............ 108/44 X |
| 4,762,258 A | * | 8/1988 | Murphy | .................... 108/44 X |
| 4,829,910 A | * | 5/1989 | Lirette | ...................... 108/35 X |
| 5,460,101 A | * | 10/1995 | Garbutt, Sr. | .............. 108/40 X |
| 5,970,884 A | | 10/1999 | Taille et al. | |
| 6,148,738 A | * | 11/2000 | Richter | ......................... 108/44 |

FOREIGN PATENT DOCUMENTS

| | | | |
|---|---|---|---|
| DE | 2647104 | 4/1978 | |
| DE | 3808083 | 4/1989 | |
| DE | 19723838 | 1/1998 | |
| DE | 19735439 | 2/1999 | |
| EP | 332059 | 9/1989 | |
| EP | 897832 | 2/1999 | |
| FR | 745029 | * 5/1933 | .................. 108/44 |
| FR | 2641506 | 7/1990 | |
| WO | 9632301 | 10/1996 | |

* cited by examiner

Primary Examiner—Jose V. Chen
(74) Attorney, Agent, or Firm—Rothwell, Figg Ernst & Manbeck

(57) ABSTRACT

A device for holding and articulating a removable rear shelf of a motor vehicle. The device has a support which is secured to the vehicle. The shelf is able to pivot relative to the support about an axis of rotation. The shelf is held relative to the support by a first portion arranged on the support and a second portion arranged on the shelf, which engage one another. The shelf can be detached by resilient deformation of the first and second portions.

12 Claims, 4 Drawing Sheets

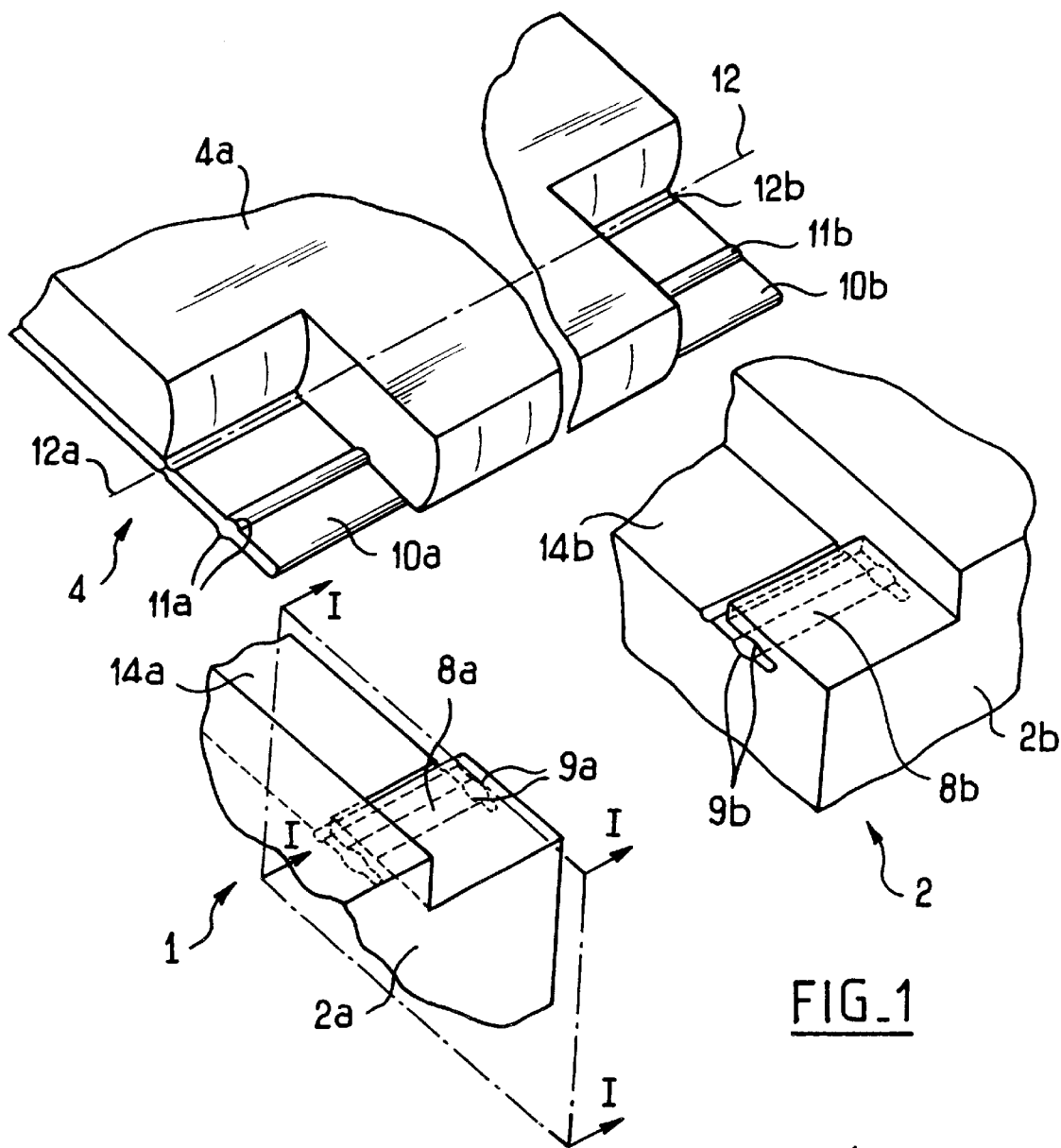
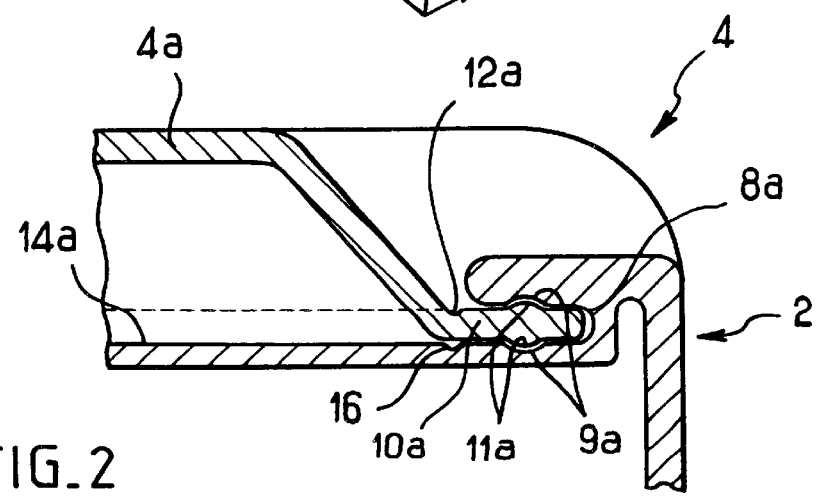
FIG_1
FIG_2

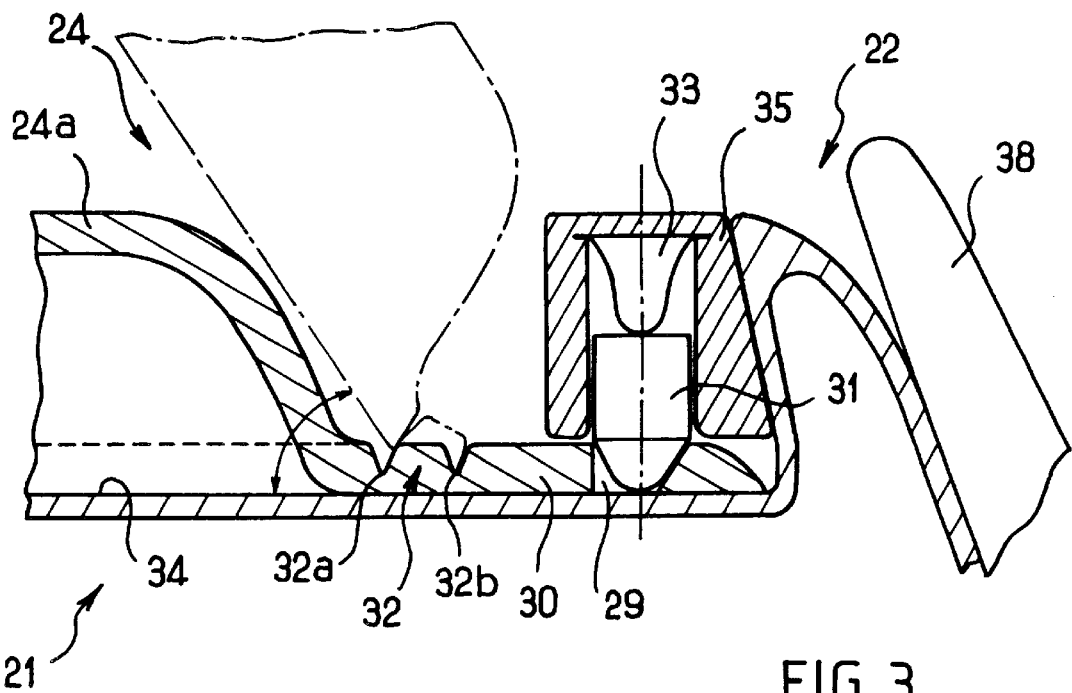
FIG_3
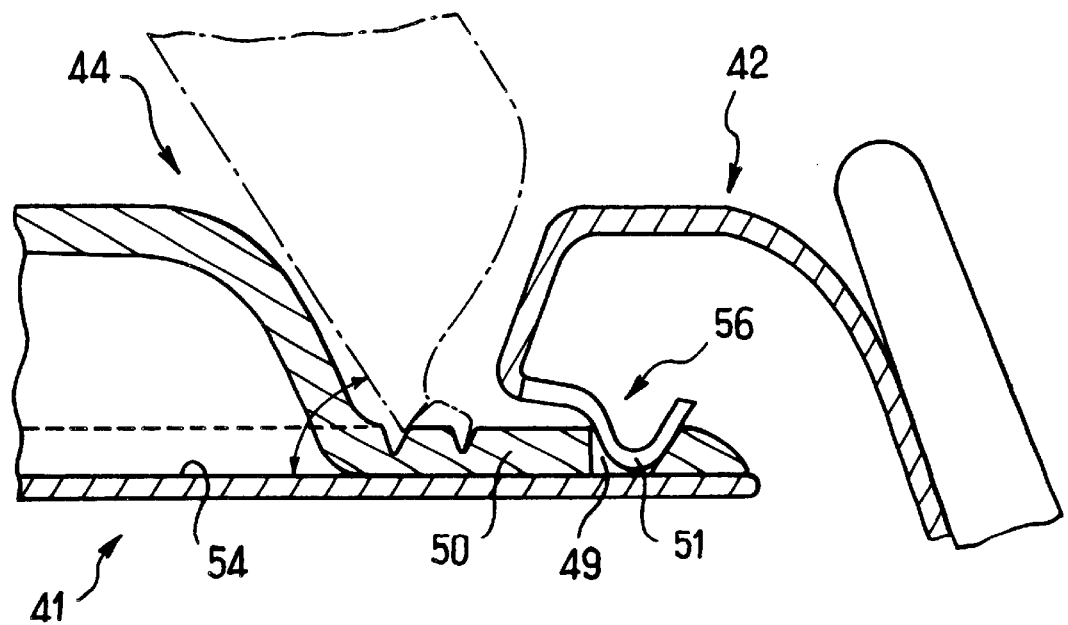
FIG_4

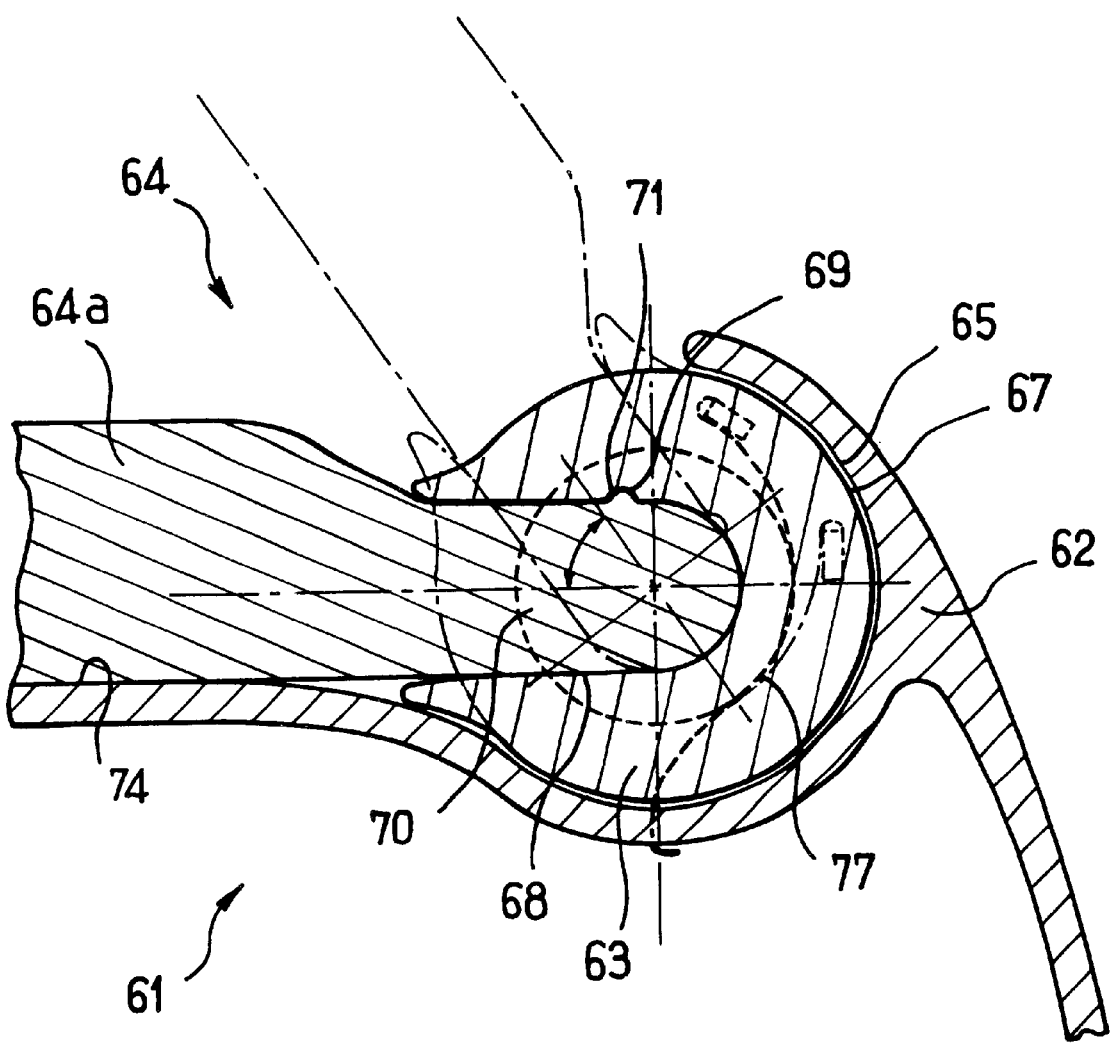
FIG_5

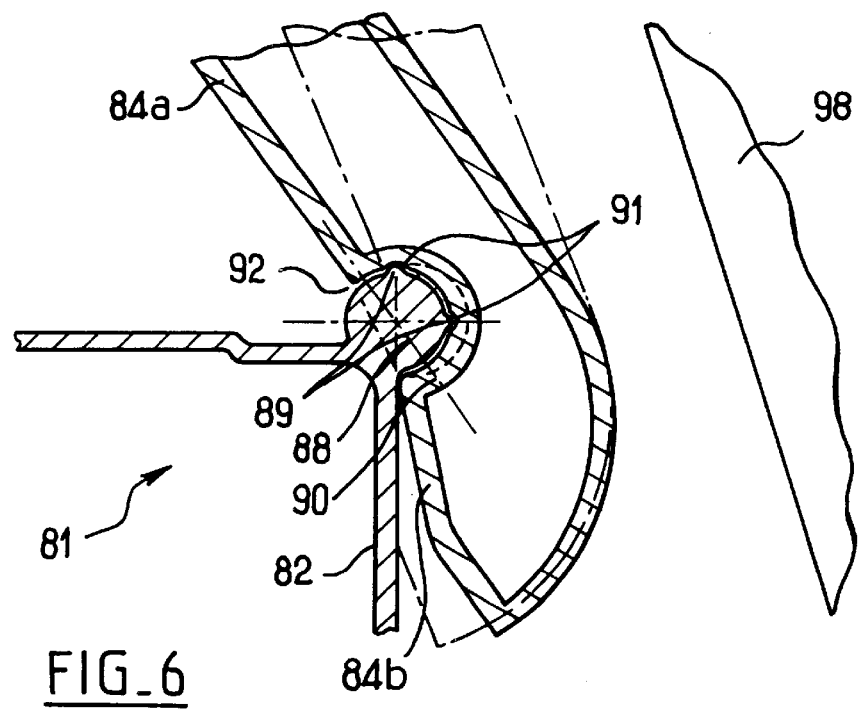
FIG_6
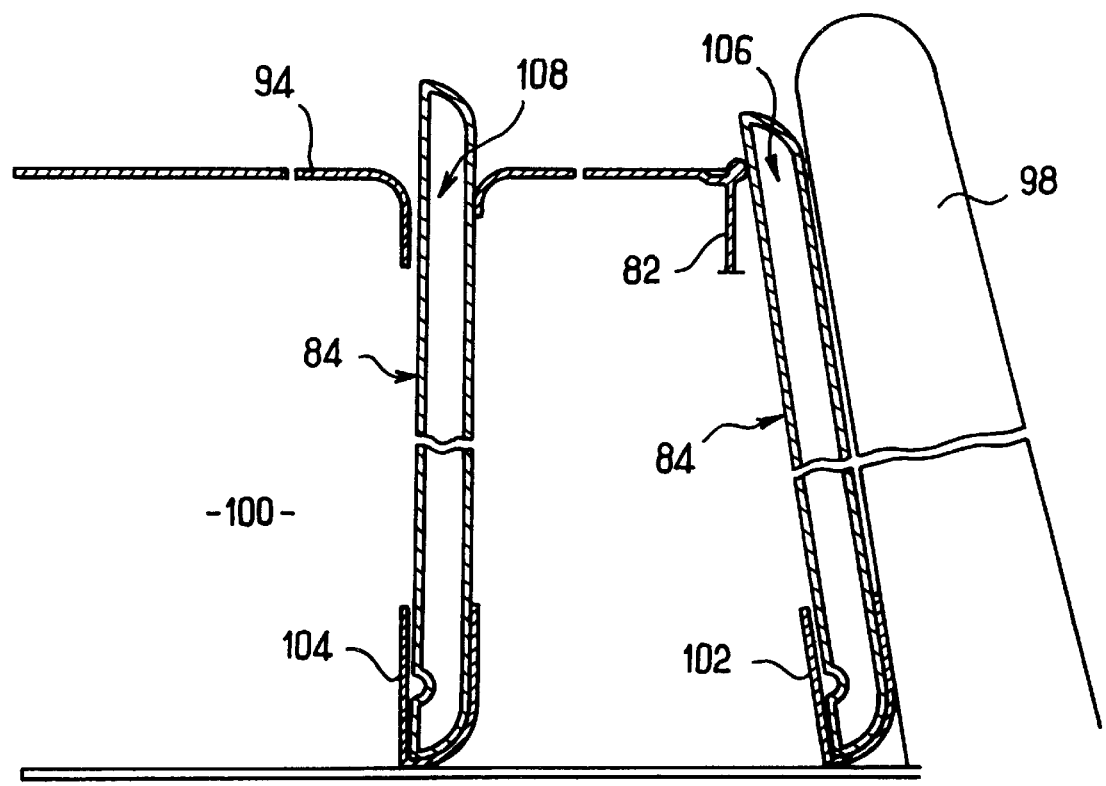
FIG_7

DEVICE FOR HOLDING AND ARTICULATING A REMOVABLE REAR SHELF OF A MOTOR VEHICLE

BACKGROUND OF THE INVENTION

The invention relates to a device for holding and articulating a removable rear shelf of a motor vehicle.

It is often useful, in particular in the case of vehicles having a rear door, on the one hand to cause the rear shelf to pivot in order to facilitate access to the trunk and, on the other hand, to remove the rear shelf in order to increase the loading capacity of the trunk.

SUMMARY OF THE INVENTION

In order to do that, the invention proposes that the device comprise:
 a support which is to be secured to the vehicle,
 articulation means for causing the shelf to pivot relative to the support about an axis of rotation,
 holding means comprising a first portion arranged on the support and a second portion arranged on the shelf, those holding means engaging in one another in order to hold the shelf relative to the support and disengaging in order to free the shelf, by resilient deformation.

The resilient deformation of the holding means enables the shelf to be held or freed readily, by exerting a slight force on the shelf in order to engage or disengage the holding means. Owing to the fact that it is not necessary to operate the holding means, as is the case when holding hooks are used, the invention facilitates the use of the shelf.

A complementary feature of the invention consists in the fact that the shelf (consisting of a single piece) comprises a main portion, at least one substantially flat tongue belonging to the second portion of the holding means, and a hinge interposed between the main portion and each tongue.

That solution enables a reduced number of parts to be used, which facilitates its manufacture and its use, and reduces its cost.

Advantageously, the tongue(s) and the first portion of the holding means incorporate, in a unitary manner, in the case of the one, at least one recess and, in the case of the other, at least one boss, so that the boss(es) is(are) inserted resiliently into the recess(es) and hold(s) the shelf relative to the support.

In a complementary manner, the invention also proposes that the first portion of the holding means comprise at least one slot, in a form complementing that of the tongue(s), into which each tongue is to be inserted in order to be retained there relative to the support, and a bearing surface extending each slot in order to facilitate the insertion of the tongue(s) into the slot(s).

Owing to the fact that the bearing surface guides the tongue in the vicinity of the slot, its insertion is relatively easy. That solution is consequently practical to use and also simple and therefore relatively strong.

By way of variation, the invention proposes that the tongue have at least one recess and the first portion of the holding means comprise a bearing surface and at least one flexible plate which is to be inserted into the recess of the tongue in order to hold the tongue and apply it against the bearing surface.

Another embodiment according to the invention, likewise permitting easy use, consists in the fact that the tongue has at least one recess and the first portion of the holding means comprises at least one pin which is to be inserted into the recess of the tongue under the action of a resilient member.

In order also to permit an even more satisfactory use of the shelf, the invention proposes that:
 the shelf be rotatable between a lower position, in which it is substantially horizontal, and an inclined upper position, and
 the device comprise a spring aiding the handling of the shelf, the force of which spring opposed to that exerted by the weight of the shelf is greater than the latter force between an unstable intermediate position and the upper position and is lesser than that latter force between the unstable intermediate position and the lower position.

Thus, the upper and lower positions constitute two stable positions of the shelf. In order to raise the shelf, the user is aided by the spring, as far as the intermediate position. Beyond that intermediate position, the shelf rises by itself. In order to lower the shelf, it is necessary only to press on it as far as the intermediate position, and beyond that position the spring ensures that the shelf is not dropped suddenly.

An advantageous embodiment of that solution consists in the fact that the spring, which is of the spiral type, acts on an intermediate member pivoting in a bore of the support and having a slot for receiving the shelf.

An advantageous feature of the invention, permitting easy release of the shelf, consists in that:
 the first portion of the holding means comprises a shaft,
 the second portion of the holding means comprises an elongate bore, the shape of which complements the shaft and which has an opening along its direction of elongation in order to permit the engagement/disengagement of the shaft,
 the shelf is rotatable between a lower position and an upper position and comprises a region forming a lever which rests on the support when the shelf is in the upper position, in order to free the shaft.

Owing to the lever, the user has a lesser force to exert in order to free the shelf.

According to a further feature of the invention, the device also comprises means for arranging the shelf in a substantially vertical position in the trunk of the vehicle, along the seat, when it is freed from the support.

Thus, the shelf can be kept in the vehicle without constituting an obstacle once detached.

By way of variation, the invention proposes that the device also comprise means for arranging the shelf in a substantially vertical position, within the trunk of the vehicle, in order to form a separating partition when it is freed from the support.

Thus, the user can reduce the movement of the load in the trunk when the load does not completely fill the trunk, or can separate the load into two when it contains products which should preferably not be placed in contact with one another.

In addition, the invention proposes that the device comprise catch means for locking the shelf in rotation in a plurality of positions, in order to maintain the shelf in at least one inclined position.

BRIEF DESCRIPTION OF THE DRAWINGS

In the drawings which accompany this description:

FIG. 1 is a perspective view of a device according to the invention,

FIG. 2 is a sectional view of the device of FIG. 1, along the plane marked I—I in FIG. 1, the shelf not being held relative to the support, FIG. 3 is a sectional view similar to FIG. 2 of a first variant of the device according to the invention, the shelf being held relative to the support, FIG. 4 is a sectional view similar to FIG. 2 of a second variant of the device according to the invention, FIG. 5 is a sectional view similar to FIG. 2 of a third variant of the device according to the invention, FIG. 6 is a sectional view similar to FIG. 2 of a fourth variant of the device according to the invention, FIG. 7 is an enlarged view of the device of FIG. 6, the shelf being placed in two arrangements.

DETAILED DESCRIPTION OF THE PREFERRED EMBODIMENTS

FIGS. 1 and 2 illustrate a device 1 basically comprising a rear shelf 4 of a vehicle, which is generally based on felt and/or plastics material, and a support 2 which is generally based on plastics material and which is to receive the shelf.

The shelf 4 comprises a structured main portion 4a that is to constitute a means of separation between the trunk and the passenger space of the vehicle, and two tongues 10a, 10b arranged in two front corners of the shelf 4. The tongues 10a, 10b are substantially flat and are each connected to the main portion 4a of the shelf by a hinge 12a, 12b having a common axis of articulation 12. In this particular case, the hinges 12a, 12b consist in a local reduction in thickness.

The support 2 comprises two lateral members 2a, 2b. Those support members 2a, 2b each have a bearing surface 14a, 14b and a slot 8a, 8b substantially in the longitudinal extension of the corresponding bearing surface.

The slots 8a, 8b have shapes complementing those of the tongues 10a, 10b in order to hold them in position relative to each of the support members 2a, 2b. In particular, the slots 8a, 8b each integrally incorporate recesses 9a, 9b which receive corresponding bosses 11a, 12a integral with each of the tongues 10a, 10b.

Furthermore, the bearing surfaces 14a, 14b each have transverse grooves 16 opposite the hinges 12a, 12b in order to avoid jamming problems during the rotation of the shelf 4.

In order to put the shelf in place, the user inserts the tongues 10a, 10b opposite the slots 8a, 8b. In order to do that, the user can place the tongues 10a, 10b of the shelf 4 on the bearing surfaces 14a, 14b guiding the tongues as far as the slots 8a, 8b.

The user then pushes on the shelf in order to insert the bosses 11a, 11b into the recesses 9a, 9b by resilient deformation. The assembly of the recesses and bosses ensures that the shelf is held, maintaining the tongues 10a, 10b inside the slots 8a, 8b.

By way of variation, the two tongues could be joined in such a manner as to constitute a single tongue extending over the entire width of the shelf.

It would also be possible to replace the recesses by bosses and vice versa.

FIG. 3 illustrates a variant 21 of the device, still comprising a shelf 24 and a support 22 composed of two side members. The single-piece shelf 24 integrally incorporates, by moulding, a main portion 24a, a substantially flat tongue 30 extending over the entire width of the shelf 24, and a hinge 32. The hinge is interposed between the tongue 30 and the main portion 24a of the shelf. It is here constituted by two grooves 32a, 32b.

The device 21 is basically distinguished from the previous device 1 in that the tongue 30 has two holes 29 instead of the bosses 11a, 11b, into which are inserted two pins 31 forming bosses instead of the recesses 9a, 9b.

The pins 31 are kept in the holes 29 under the pressure of a resilient member, in this case a rubber finger 33, and bear on the tongue 30 in order to apply it to the surfaces 34 of the support 22. Each pin 31 is guided in a cage 35 secured to the support 22, in the vicinity of the rear seat 38 of the vehicle. The shelf 24 is consequently held by its front portion.

FIG. 3 illustrates the shelf 24 with a dot-dash (phantom) line in the upper position, raised by rotation about the hinge 32, and with a solid line in the lower position resting on the bearing surfaces 34 of the support members 22.

FIG. 4 illustrates a device 41 which is basically distinguished from the device 21 of FIG. 3 in that each of the two pins 31 and each of the two resilient members 33 has been replaced by a single component, a flexible plate 56, which is here produced in a unitary manner with each of the support members 42. The shelf 44 is substantially identical to the shelf 24.

Advantageously, those two plates 56 extend transversely over a length of approximately from 10 to 20 millimetres and have substantially conical bosses 51 which are inserted into holes 49 formed in the tongue 50 of the shelf 44. Owing to their short length, those plates, which are integral with the support members 42, exhibit a resilience enabling them to hold the tongue 50 and to apply it against the bearing surfaces 54 of the support 42.

FIG. 5 illustrates a device 61 comprising a support 62 composed of two side members, a non-articulated shelf 64 and two substantially cylindrical intermediate members 63, which are substantially U-shaped in cross-section. Here, the shelf 64 has two slightly tapered tongues 70 rigidly extending a main portion 64a.

Each intermediate member 63 has an oblong internal cavity 68 similar to the slots 8a, 8b of the device 1 and a substantially cylindrical outer surface 67. Each tongue 70 has bosses 69 which are inserted resiliently into recesses 71 of the intermediate member 63 in order to ensure that the shelf is held relative to the support 62.

Each support member 62 has an elongate bore 65 in which the intermediate member 63 is inserted in order to pivot there. The bore 65 has a radial opening of less that 180 degrees, extending along its direction of elongation and traversed by the tongue 70. In addition, a spiral spring 77 is connected at one of its ends to the intermediate member and at its other end to the support 62.

The assembly formed by the intermediate member 63 and the spiral spring 77 constitutes an aid to handling the shelf 64, by exerting a couple opposing that exerted by the weight of the shelf.

The couple exerted by the spiral spring is slightly smaller than that exerted by the weight of the shelf, when the shelf is in the substantially horizontal lower position resting on the bearing surface 74 of the support, represented by a solid line in this Figure. On the other hand, when the shelf is in the upper position represented by a dot-dash line (phantom line) in FIG. 5, the couple exerted by the spiral spring is slightly larger than that exerted by the weight of the shelf.

In other words, in the absence of external action, below an intermediate position constituting an unstable equilibrium, the shelf tends to go down in order to rest on the bearing surface 74 and, above that intermediate position, it tends to rise until it reaches the upper position.

FIGS. 6 and 7 illustrate a device 81 comprising a support 82 and a rigid shelf 84. The support 82 comprises a shaft 88 having a circular cross-section which is inserted in a bore 90 of complementary shape formed in the shelf 84 in order to cause it to pivot.

The bore 90, which is resiliently deformable, has a direction of elongation and a radial opening 92 which extends along its direction of elongation and which is slightly less than 180 degrees, so that it is substantially "Ω"-shaped in cross-section, in order to enable the shaft 88 and the bore 90 to be engaged or disengaged resiliently.

The shelf 84 extends on each side of the bore 90. It has a main portion 84a arranged on one side of the bore and a portion forming a lever 84b extending the main portion beyond the bore 90.

When the shelf 84 is in the upper position, illustrated by a solid line in FIG. 6, the lever 84b rests on the support 82. If the user continues his movement of lifting the main portion of the shelf, it brings about the separation of the bore 90 and the shaft 88, by resilient deformation and, more precisely, the widening of the opening 92, as illustrated by a dot-dash line (phantom line).

Furthermore, the shaft 88 comprises bosses 89 which are inserted resiliently into recesses 91 of the bore in order to maintain the shelf in given inclined positions. Those bosses and those recesses constitute catch means for locking the rotation of the shelf.

As illustrated in FIG. 7, the device 81 also comprises first retaining members 102 which are arranged on the side walls of a trunk 100, in the lower portion thereof, in the vicinity of the seat 98. Owing to the fact that a space 106 is also formed between the support 82 and the rear seat 98 of the vehicle, the shelf 84 can be arranged in the trunk 100, substantially vertically, along the rear seat 98. It is then retained in the lower portion in the retaining members 102 and in the upper portion by the seat 98 and the support 82.

In addition, the bearing surface 94 on which the shelf rests in the articulated lower position has, substantially at its centre, a hole 108 permitting the passage of the shelf 84 through it, substantially vertically.

The device also has second retaining means 104 arranged on the side walls of the trunk 100, substantially plumb with the hole 108. The shelf 84 can then also be arranged substantially vertically within the trunk 100. It is retained there in the lower portion by the retaining members 104 and in the upper portion by the bearing surface 94 of the support 92, on each side of the hole 108.

The shelf then forms a transverse partition in the trunk.

We claim:

1. An assembly comprising a removable rear shelf of a motor vehicle and a device for holding and articulating said removable rear shelf, said device comprising:
   a support which is to be secured to the vehicle, said support having an axis of rotation,
   means for pivoting the shelf relative to the support about the axis of rotation,
   holding means comprising a first portion arranged on the support and a second portion arranged on the shelf, said holding means engaging one another in order to hold the shelf relative to the support and disengaging in order to free the shelf, by resilient deformation,
   wherein the shelf comprises:
      a main portion; and
      said second portion of the holding means comprises at least one substantially flat tongue; and
      a hinge is interposed between the main portion and each said tongue.

2. An assembly according to claim 1, wherein:
   the first portion of the holding means incorporates at least one recess; and
   the tongue comprises at least one boss;
   and wherein:
      the boss is inserted into the recess and holds the shelf relative to the support.

3. An assembly according to claim 2, wherein the first portion of the holding means further comprises at least one slot, said slot including a bearing surface;
   said tongue being inserted into said slot in order to be retained there relative to the support.

4. An assembly according to claim 1, wherein:
   the tongue incorporates at least one recess;
   the first portion comprises at least one boss;
   and wherein:
      the boss is inserted into the recess and holds the shelf relative to the support.

5. An assembly according to claim 4, wherein:
   the first portion of the holding means comprises a bearing surface;
   said first portion of the holding means further comprising at least one flexible plate;
   said boss being inserted into the recess of the tongue in order to hold the tongue and apply it against the bearing surface.

6. An assembly according to claim 1, wherein:
   the tongue has at least one recess;
   the first portion of the holding means comprises at least one pin;
   said first portion of the holding means further comprises a resilient member, said resilient member biasing said pin;
   and wherein said pin is inserted into the recess of the tongue under the action of said resilient member.

7. An assembly comprising a removable rear shelf of a motor vehicle and a device for holding and articulating said removable rear shelf, said device comprising:
   a support which is to be secured to the vehicle, said support having an axis of rotation,
   means for pivoting the shelf relative to the support about the axis of rotation,
   holding means comprising a first portion arranged on the support and a second portion arranged on the shelf, said holding means engaging one another in order to hold the shelf relative to the support and disengaging in order to free the shelf, by resilient deformation,
   wherein:
      said shelf has a weight;
      the shelf has a lower position, in which it is substantially horizontal; said shelf has an upper position in which it is substantially inclined;
      said shelf has an unstable intermediate position between said lower position and said upper position;
      said shelf being rotatably movable between said lower position and said upper position, through said intermediate position; and
      the device comprises:
         a spring; a force of said spring being greater than the weight when said shelf is between said intermediate position and the upper position; and
         the force of said spring being less than that weight when said shelf is between the intermediate position and the lower position.

8. An assembly according to claim 7, wherein:
   the spring is a spiral spring;
   said support comprises a bore;

an intermediate member being pivotably mounted in said bore;

said intermediate member having a slot;

said slot receiving the shelf.

9. A vehicle comprising a trunk, a removable rear shelf of said vehicle and a device for holding and articulating said removable rear shelf, said device comprising:

a support which is secured to the trunk, articulation means for causing the shelf to pivot relative to the support about an axis of rotation, holding means comprising a first portion arranged on the support and a second portion arranged on the shelf, said holding means engaging one another in order to hold the shelf relative to the support and disengaging in order to free the shelf, by resilient deformation, wherein:

the first portion of the holding means comprises a shaft, the second portion of the holding means comprises an elongate bore having an opening along a direction of elongation, said bore being resiliently deformable;

the shelf is rotatable between a lower position and an upper position, and further comprises a lever;

said lever resting on the support when the shelf is in the upper position, in order to free the shaft.

10. A vehicle according to claim 9, further comprising means for arranging the shelf in a substantially vertical position in the trunk of the vehicle, along the seat, when it is freed from the support.

11. A vehicle according to claim 9, further comprising means for arranging the shelf in a substantially vertical position, within the trunk of the vehicle, in order to form a separating partition, when it is freed from the support.

12. A vehicle according to claim 9, further comprising catch means for locking the rotation of the shelf, in order to maintain the shelf in at least one inclined position.

* * * * *